United States Patent [19]

Kane

[11] 3,925,259
[45] Dec. 9, 1975

[54] CATALYTIC STRUCTURE FOR THE PURIFICATION OF WASTE GASES AND ITS METHOD OF PREPARATION

[75] Inventor: Robert Harvey Kane, Ho-Ho-Kus, N.J.

[73] Assignee: The International Nickel Company, Inc., New York, N.Y.

[22] Filed: Nov. 12, 1973

[21] Appl. No.: 411,691

[52] U.S. Cl............ 252/470; 252/467; 252/477 R; 423/213.2; 423/213.5
[51] Int. Cl.²........................................ B01J 23/84
[58] Field of Search............... 252/467, 470, 477 R; 423/213.2, 213.5

[56] References Cited
UNITED STATES PATENTS

| | | | |
|---|---|---|---|
| 3,565,574 | 2/1971 | Kearby et al. | 252/474 X |
| 3,718,733 | 2/1973 | Gehri | 423/213.2 |
| 3,773,894 | 11/1973 | Bernstein et al. | 252/474 X |

*Primary Examiner*—W. J. Shine
*Attorney, Agent, or Firm*—Miriam W. Leff; Ewan C. MacQueen

[57] ABSTRACT

A catalytic structure providing high surface area and low resistance to flow is prepared from a powder comprising an alloy containing chromium and copper by depositing the powder on a shaped preform with the aid of a fugitive binder and heating the coated substrate to effect liquid-phase sintering of the powder. In one embodiment an alloy of Cr—Ni—Cu coated on an open mesh preform serves as a catalyst in the purification of an automotive exhaust stream.

22 Claims, No Drawings

CATALYTIC STRUCTURE FOR THE PURIFICATION OF WASTE GASES AND ITS METHOD OF PREPARATION

BACKGROUND OF THE INVENTION

This invention relates to a catalytic structure and a process for producing such structure, and more particularly to the production of a catalytically active structure which is especially suited for high temperature use in a gaseous stream. In a specific embodiment, the present invention is directed to the preparation of catalysts comprised of an alloy consisting essentially of Cr—Ni—Cu in the form of a structure which is highly effective for the purification of automobile exhaust and industrial waste gases.

It is well known that catalysts may be used in a variety of forms in a catalytic bed, and that the catalyst structural design plays a marked role in determining catalyst suitability for a particular process. The interrelationships of the catalyst composition, design and process conditions are highly complex and often difficult to isolate from each other. In many processes using fixed bed catalysts, where large volumes of gaseous or liquid are passed through the reactor, it is advantageous to have a high surface area of the catalyst exposed relative to the amount of catalyst so as to facilitate contact of the reactants at the surface. The availability of the catalyst surface is particularly important in certain gaseous reactions, such as the purification of automobile engine exhaust streams and nitric acid plant tail gas streams, where the gas may pass through or adjacent to the catalyst at a very high linear velocity. In such processes, conventional particulate catalysts, e.g., pellets, chips, cylinders, spheres, and the like, have the disadvantage that they contribute to back-pressure build-up in the system. Also, the particulate catalysts are more subject to attrition than a catalyst in which the movement is more restricted. In such types of reactions a structural form which will permit free passage of the reacting gases relative to the surface exposed will greatly enhance the suitability of an active catalytic material. Typical of the high surface area - larger open area stationary catalyst structures are metal gauze, woven metal screens, expanded metal mesh, honeycomb, metal foam, and knitted metal mesh. These may be massive catalyst structures or the catalyst may be deposited on a support of suitable design. The supports which may be, for example, of metal, ceramic, or glass, may participate in the catalytic activity or may serve merely to present the catalyst in a suitable structural pattern.

Co-pending U.S. Application Ser. No. 411,692, filed Nov. 12, 1973 describes catalysts which are useful for high temperature applications, particularly for the purification of automotive exhaust streams. These catalysts are comprised of alloys containing at least chromium and copper. The chromium-copper alloys are effective oxidation catalysts, e.g., for oxidizing CO to $CO_2$, and alloys of chromium-nickel-copper are particularly suitable for the removal of oxides of nitrogen as well as carbon monoxide and hydrocarbons from such exhaust streams. While the catalysts disclosed exhibit excellent activity and selectivity for many reactions, they are expensive to fabricate into complex shapes by conventional hot and cold working techniques because of limited malleability at room temperature.

It is an object of the present invention to provide a catalyst in a form which is especially suited for reactions involving high velocity gas or liquid flow reactants.

Another object is to provide a catalyst of a structural design which has a high surface area and large open area relative to the amount of catalyst.

A further object is to provide a catalyst structure consisting of a coating of the catalytically active material on a pre-formed structure which is stable at high temperatures.

A still further object is to provide a catalyst structure consisting of an alloy comprising, for example, of chromium and copper, or chromium, nickel and copper, on a pre-formed metal mesh substrate, constructed, for example, of nickel, a nickel-base alloy, or austenitic stainless steel.

The objects and advantages will become apparent from the following description.

In accordance with the present invention a coherent catalyst comprising an alloy of chromium and copper is provided in a suitable structural form for permitting high rates of mass transfer and low resistance to flow by means of liquid-phase sintering of the alloy prepared as a pre-alloyed powder. In a preferred embodiment, the catalyst precursor alloy is provided as a coherent adherent coating on a substrate of suitable design.

THE INVENTION

Briefly, in accordance with this invention a fine powder comprised of an alloy containing chromium and copper is:

a. formed into the desired shape, and b. the shaped powder is heated to a temperature above about 2050°F in a non-oxidizing atmosphere for a period of time sufficient to effect a liquid-phase sintering of said fine powder.

In a preferred embodiment, the pre-alloyed powder is deposited on a substrate of a desired shape with the aid of a fugitive binder. The binder is applied, e.g., by spraying, painting, dipping or the like, on the pre-form, and the pre-alloyed powder is applied to the coated substrate. The substrate with the alloy powder thereon is then heated in an atmosphere containing low effective oxygen potentials to drive off the binder and permit liquid-phase sintering of the coating on the substrate. The initial temperature required to drive off the volatile binder constituents is of the order of 600° to 1200°F., depending on the binder. Liquid-phase sintering is effected rapidly at a temperature just in excess of the alloy solidus temperature, e.g., above about 2050°F. and for a period of time sufficient to form a continuous sintered layer of the alloy on the substrate. The required temperature and heating time, as explained below, depend mainly on the composition of the alloy. The catalytic structure formed in this manner is comprised of a pre-formed shaped substrate of a material which can withstand high temperatures, and coated on said substrate a coherent, adherent layer comprising a substantially uniform alloy containing chromium and copper, said coating being catalytically active. The latter coating can be treated at an elevated temperature in a gas phase atmosphere which is oxygenating with respect to said alloy to develop an oxidation resistant stratified catalytically active surface on the coherent alloy layer. The catalytic coating per se formed in this way has high structural integrity, exhibiting mechanical properties essentially equivalent to those of the catalyst precursor alloy prepared in bulk form.

DESCRIPTION OF PREFERRED EMBODIMENTS

1. The Pre-Alloyed Powder

As indicated above, it is an essential feature of this invention that the precursor powder is comprised of an alloy containing chromium and copper. It will be appreciated, however, that the composition of the catalyst of choice will depend on the nature of the reaction for which it is used, and the composition of the precursor material will, in turn, depend on the catalytic composition desired. The aforementioned co-pending application describes catalysts particularly suitable for use as exhaust purification catalysts and also discloses the preparation of alloy powders particularly useful in the preparation of such catalysts. Among the preferred alloy powders prepared are those formed by mechanical alloying and gas atomization. These methods are shown to produce uniform alloy compositions which can be utilized as precursors to active selective and durable catalysts.

Mechanically alloyed powders and a method of forming such powders are disclosed in detail in U.S. Pat. No. 3,591,362. This method involves high energy milling of powders, e.g., in an attritor, under dry conditions, to form particles having a uniform interspersion of the starting materials and a substantially saturation hardness level. Atomized powders and methods for their preparation are well known. Generally, atomization is a process which involves forming a melt of an alloy composition, forcing the melt through an orifice, for example by gravity, and causing a gas (or liquid) stream to impinge on the stream of melt emerging from the orifice, thus disintegrating the melt stream to produce individual spheres on solidification.

In general, powder metallurgy techniques are preferred for forming the alloy powders used in the process of the invention. The mechanical alloying technique is especially useful for preparing alloy powders which contain non-metals. Atomization may be preferred to obtain suitable alloy powders at a relatively low cost. Splat cooling and plasma spraying are examples of other methods useful for forming suitable alloy powders. While these methods produce suitable alloys for preparing catalytic structures in accordance with this invention, the present process is not limited with respect to the method by which alloy powders are formed.

With regard to the composition of the precursor powders it was noted above that the choice of composition will depend on the reaction. For example, the alloy may consist of chromium and copper, e.g., 35% chromium and the balance essentially copper. Examples of alloys particularly suitable for the selective reduction of nitrogen oxides and oxidation of CO, as disclosed in the aforementioned co-pending application, may contain a major amount, e.g., up to about 60%, nickel, and lesser amounts of other elements such as iron, cobalt, platinum group metals, vanadium, manganese, as well as incidental elements and impurities. Compounds such as oxides of chromium, aluminum, silicon, barium, lead, e.g., $Cr_2O_3$, $Al_2O_3$, $SiO_2$, BaO, may also be incorporated in the initial powder. Exemplary of the alloys disclosed in the aforementioned co-pending application are 35Cr—13Ni—52Cu, 25Cr—15Ni—60Cu, 15Cr—50Ni—35Cu and 25Cr—30Ni—45Cu. It will be appreciated that process conditions for effecting the liquid-phase sintering in accordance with this invention will vary depending on the composition, and this will be discussed below.

With respect to the precursor powder, it is not essential that all components of the catalyst composition be present as a pre-alloyed powder. Thus, while a catalyst composition may be made from an initial powder of the alloy 35Cr—13Ni—52Cu, it may also be prepared from a mixture of alloys and elemental powders, e.g., 41Cr—59Cu with sufficient nickel powder to form 35Cr—13Ni—52Cu. As another example, the alloy powder 35Cr—13Ni—52Cu may be mixed with sufficient nickel powder to form the composition 25Cr—40Ni—35Cu. In accordance with this invention, however, the lower melting component, viz., copper, is present in the precursor powder substantially as an alloy so that it cannot melt massively before it is sintered as an alloy. The copper-rich phase of the alloy is higher melting than elemental copper, but lower melting relative to the nickel and chromium-rich phase. Thus, for example in Cr—Cu and/or Cr—Ni—Cu alloy compositions, the initial or precursor alloys, i.e., the alloys containing chromium and copper, are characterized by the presence of a lower melting copper-rich phase relative to any other phase or phases present of nickel and copper and chromium which may be in equilibrium with the lower melting copper-rich phase at the sintering temperature. Preferably, also, the chromium is present in the precursor powder substantially as an alloy for reasons of cost, to keep the chromium free of oxide at this stage, and to promote the equilibrium composition of the chromium-rich phase when a chromium-rich phase is a component of the equilibrium composition.

BINDER

As noted above, in a preferred embodiment of this invention, the precursor powder is applied to a substrate with the aid of a binder, the binder being employed to cause the powder to adhere to the substrate until sintering of the powders can be effected.

As the binder, a fugitive material is employed to ensure that no contamination of the alloy occurs that might affect its catalytic behavior. Some small amount of pyrolized carbon may be entrapped, without injury, and some superficial oxidation may or may not occur. This oxidation may be removed by abrasion, sandblasting, etc., and possibly by a chemical treatment.

Exemplary of suitable binders are heat fugitive thermoplastic resins, distillable hydrocarbon waxes, polyvinyl alcohol, an alkyl, e.g., methyl or ethyl, cellulose, organic elastomers, or other such binders known to those skilled in the art of powder metallurgy. These fugitive materials may be mixed with compatible solvent systems which volatilize at suitable temperatures.

Among the preferred binders used to apply the powders to a substrate are organic elastomers in a compatible vehicle such as thinned solutions of natural rubber (hevea) in organic solvents of toluene, acetone or methyl ethyl ketone, or synthetic polyisoprene in n-heptane, or by use of latex-based spray adhesives in aerosol form using organic vehicles such as xylene. It appears that minor differences in solvents or elastomer types have little influence on the sintering or subsequent properties both because such a small amount is used (estimated at less than 0.1% of the composite weight) and because the high temperatures involved in sintering bring all the elastomers and organic solvents to a similar state.

The elastomeric adhesive may be applied by, e.g., brushing, dipping and wiping, or by spraying. Heavy layers may be built up by repeated applications of adhesive and powder, directly as in spraying, but intermittently when dipping or brushing as some curing time must be allowed between coats.

Temperatures used to drive off the binder depend on the binder chosen. Generally the solvents and water vapor will start to evolve at about 600° to 750°F with binders such as polyvinyl alcohol and natural rubber. At about 1200°F some cracking and decomposition will occur and some CO will be formed. This, advantageously, tends to form a protective atmosphere around the coating at the liquid-phase sintering temperature.

SUBSTRATES

In a preferred embodiment of this invention the substrate's principal function is to provide a suitable structural configuration. Thus, there is a requirement that the substrate be appropriately readily formable into the desired shape. As explained later, the desired shape is one which provides a high surface area of catalyst relative to the total amount of catalyst and will offer low resistance to flow. Configurations of this type are referred to herein as open mesh structures. Examples of suitable open mesh configurations, as noted previously, are gauzes, knitted or woven wire mesh, metal foam, expanded metal mesh, honeycomb, and the like. Another requirement is that substrate material have a melting point above the sintering temperature of the alloy. The high temperature readily formable material may be a metal, e.g., 304 stainless steel, Nichrome, Inconel alloy 601, and molybdenum, or a ceramic, e.g., alpha alumina, mullite, and cordierite. Preferred substrate metals are those which, in addition to withstanding high temperatures, form no detrimental phases, such as sigma, at the catalyst-substrate interface. There is a further requirement if the substrate that it be wetted to some degree by the molten copper-rich liquid. Many techniques are known to increase wettability. In the case of ceramics, for example, a flash coating of metal, e.g., of nickel improves the wettability of the ceramic.

Advantageously, the substrate is inert to the system in which it is used. However, the catalytic coating may serve as a protector as well as a catalyst. Possibly, also the substrate can serve to enhance the catalytic activity or selectivity of the coating.

LIQUID-PHASE SINTERING

The precursor powder is developed into a catalytic material in the configuration desired by a method known as liquid-phase sintering.

Liquid-phase sintering is a well-known method of bonding powders into a coherent mass. A major difference from the so-called conventional sintering technique is that in the conventional method a powder mass or compact is heated to a rather high temperature but below its melting point. In liquid-phase sintering the powder mass is treated to a temperature where at least one of the components is liquid and both liquid and solid co-exist during the process. Liquid-phase sintering provides a method of approaching 100% theoretical density; thus, it has been used mainly to produce materials of very high density and little porosity. For example, it has been used to produce "heavy alloy," a composite of tungsten, copper and nickel. It has also been used to enhance the ductility of a brittle component, such as chromium in Cu—Cr and Cr—Au alloys, tungsten in W—Ni—Fe and W—Ni—Cu alloys, and molybdenum in Mo—W—Ni and Mo—Cu—Pd alloys. In the above examples, the liquid-phase sintering process was used to make a composite as dense and non-porous as possible or to make a particular component of an alloy more ductile, and the alloys were prepared in bulk form, using elemental powders, unsupported, by conventional lubricated pressing and sintering in inert atmospheres.

It has also been disclosed, for example, in U.S. Pat. No. 3,441,409 that a corrosion resistant alloy may be formed from elemental nickel and copper powders by liquid-phase sintering. One method proposed in the aforesaid patent involves mixing the elemental copper and nickel powders with a volatile binder, depositing the powders plus binder on a substrate, and heating the mass to drive off the binder and to develop a product described as a coating which is non-homogeneous. In this technique there is the ever-present problem of "run-off" of the low melting copper-rich liquid which is formed, and as indicated, the product is not homogeneous.

In accordance with the present invention the precursor powder, which contains a pre-alloyed powder containing copper and chromium, is heated at a temperature in the range of about 2050° to about 2275° for a period of time sufficient to effect liquid-phase sintering of the powder. this occurs rapidly at temperatures above about 2050°F.

It will be appreciated that effective temperatures for developing the desired catalytic structures in accordance with this invention will depend on variables such as the time of exposure, the composition of the alloy being formed, the thickness and thermal characteristics of the substrate, and the manufacturing facilities. In general, it is desirable to use lower temperatures and shorter sintering times - consistent with forming a uniform and continuous coating. It has been found, for example, that the following sintering temperatures are effective for forming suitable coatings on a 2/0 mesh - 5 mil thick Ni—20Cr expanded metal mesh preform.

| COMPOSITION % | | | SINTERING TEMPERATURE °F | |
|---|---|---|---|---|
| Cr | Ni | Cu | PREFERRED RANGE | 60 sec. Exposure |
| 25 | 15 | Bal. | 2050–2125 | 2100 |
| 35 | 13 | Bal. | 2050–2125 | 2080 |
| 25 | 30 | Bal. | 2050–2125 | 2075 |
| 15 | 50 | Bal. | ABOVE 2175 | 2240 |

Generally, with increasing peak temperature, the coatings become smoother and more uniform, and where the organic binder is used, the coatings have slightly less tendency to be oxidized, due to the protection afforded by CO which is derived from carbon deposits from the organic binder.

It is believed that insufficient temperature results in a non-uniform coating because not enough liquid is present to cause deformation of the individual powder particles. Thus, for the formation of a suitable coating, advantageously, at least about 15 vol. % of the powder should form as a liquid at the sintering temperature. On the other hand, for certain compositions overheating leads to coarsening of the particles of chromium and/or nickel-rich solid solutions and to loss of copper-rich liquid alloy by capillary action to parts of the support and- /or furnace. Overheating may also cause embrittlement of the substrate-preform by grain boundary attack by the copper-rich phase. For alloys consisting of the nickel-rich solid solution with a small amount of copper-rich solution, the problem of overheating is not as critical since coarsening cannot occur and there is little copper-rich solution to attack the substrate at the sintering temperature. An alloy of the latter type is 15Cr—50Ni—35Cu.

There are also variations in optimum conditions for treatment depending on how the precursor alloy powder is prepared. For a very fine dispersion of alpha-chromium in alloys which have a relatively low nickel level, e.g., 25Cr—15Ni—60Cu or 35Cr—13Ni—52Cu, mechanical alloying is preferred. The structure can be controlled by a short intermediate heat treatment, i.e., a precipitation anneal, prior to liquid-phase sintering. if temperatures are too low, alpha-chromium precipitation is sluggish and the bulk of the chromium comes out at the sintering temperature, hence is coarse; if temperatures are too high, then the structure is also coarse. Thus, before reaching the peak temperature to effect liquid-phase sintering the alloy powder which is formed by mechanical alloying (and one which has a relatively low nickel level) is subjected to an intermediate temperature hold at about 1600°F to about 2000°F for a period of time sufficient to control the particle size and interparticle spacing. A 3-minute hold at 1700°F has been found to be satisfactory. It has also been found that the particle size distribution of the chromium-rich phase is not greatly affected at sintering temperatures below about 2100°F by experiments with pre-alloyed powder. This was shown by comparision of structures of pre-alloyed powder and sintered coatings. Hence the degree of control of microstructure using mechanically alloyed powder depends upon the time and temperature of the intermediate soaking treatment, as well as the rate of heating to the sintering temperature.

Powders prepared by a gas atomization technique have a particle size below about 250 microns. Such powders do not require an intermediate temperature hold because the nickel-rich and/or chromium-rich solutions are unalterable following atomization prior to sintering and can only be affected by the melt temperature and the solidification rate in the atomization process.

It might be noted that because the present process involves some local melting, some compositional inhomogeneities occur. However, the spacial scale of the resulting inhomogeneities if of the same order as the prior powder particle size. with respect to the size and shape of the powder in the precursor material, there is no apparent limitation on powder sizes, and the powder shape does not affect the process. It was found that coatings of uniform thickness are readily achieved using flowable gas-atomized powder, discarding the fraction coarser than plus 60 mesh. However, continuous claddings have been obtained with even very flaky mechanically alloyed powder.

In the precess of this invention, sintering must be carried out in atmospheres having low effective oxygen potentials to avoid oxidation of the alpha-chromium phase. Thus, for example, atmospheres containing free $O_2$, water vapor, or $CO_2$ should be avoided. High vacuum, very low dew point hydrogen, or inert gas atmospheres (e.g., argon or helium) are suitable. Nitrogen, or a $N_2$—$H_2$ atmosphere, is also satisfactory, but only for short time exposures as nitridation may occur with time.

THICKNESS OF COATINGS

Coatings of a thickness of about 2 to about 100 mils, e.g., 15 mils and thicker may be formed by repeating the coating steps prior to sintering until a coating of the desired thickness is obtained. Sintered claddings of about 1 to 2 mils thick may be produced using one application of minus 200 mesh powder. with powders passing a 60 mesh screen, as above, the thickness is controlled to 3—5 mils (following sintering) per application. It is anticipated that one such application will suffice for most contemplated uses, but coating thickness can be altered by sequential coating, increasing the maximum particle size, or using more binder and powder per application. It should be appreciated that the application of powder in each new experimental or production facility must be optimized to give the desired final cladding thickness.

The coatings can be formed on a substrate in a batch process or a continuous process. For the continuous process, the open mesh substrate can serve as a conveyor belt, the fugitive material and the precursor alloy powder can be applied in turn, and the resultant coated substrate can be subjected to the heat treatment in a furnace under the above-indicated conditions.

For the purpose of giving those skilled in the art a better understanding of the invention, the following illustrative examples are given.

EXAMPLE 1

PREPARATION OF PRECURSOR POWDER a. MECHANICAL ALLOY POWDER

Various alloys of chromium-nickel-copper were produced by mechanically alloying dry powder in a capacity Szegvari attritor. Each charge was 3000 grams and the attritor was operated at an impeller speed of about 288 rpm with an 70,000 gram charge of ⅜-inch diameter hardened steel balls under an atmosphere of 2 psi argon for 18 hours. The resultant powders were drained over a period of 2 hours.

Typically, for the preparation of an alloy having the composition 35Cr—13Ni—52Cu, the charge to the attritor consisted of fine elemental powders of Cr, Ni and Cu in the given proportions. The bulk of the resultant powder consisted of particles passing through a 20 mesh screen.

Similarly, samples were made having the compositions 25Cr—15Ni—60Cu, 15Cr—50Ni—35Cu, 15Cr—15Ni—70Cu, 25Cr—30Ni—45Cu, and 15Cr—34Ni—51Cu.

b. ATOMIZED POWDER

Electrolytic copper, vacuum melting grade chromium and nickel pellets in the proportions 52:35:13 were charged into a coreless induction furnace of 45 Kg. capacity and melted in vacuo. To assure solution of the Cr, the melt temperature was raised to 2900°F and the melt was atomized by pouring into a heated tundish containing a metering nozzle, forming the melt into a cylindrical stream that was disintegrated by argon jets. The resulting powder consisted of particles, 90 percent of the weight of which passed through a 40 mesh sieve.

EXAMPLE 2

Coupons of expanded metal mesh (2/0 mesh of 7 mil thick Nichrome, a Ni—Cr—Fe alloy) were sprayed with a rubber cement (Krylon Spray No. 8010, a product of the Borden Co.) and coated with a mechanically alloyed 35Cr—13Ni—52Cu alloy powder (produced as described in Example 1a), by sifting the powder over the sprayed mesh substrate. These samples were treated as follows: in dry argon samples were heated individually to 1700°, 1800° and 1900°F at a rate of 500°F per minute and held for three minutes. The temperature was then raised at a similar rate until a temperature of 2100°F was reached, then samples were allowed to cool to 300°F before exposure to the air. These samples were compared with a sample treated in the same way but with no intermediate temperature treatment. The microstructures of all samples were substantially alike in that a uniform cladding of the precursor alloy was produced having thicknesses between 3 and 10 mils, with a diffusion bond between the precursor alloy and the nickel-based alloy substrate. Those samples having been treated at intermediate temperatures had an average particle size of the Cr-rich phase of 4 microns, while the direct sintered sample had Cr-rich particles of about 8 microns in diameter. There was little difference among those samples pretreated. While the effect of pretreatment is more marked in powders not subjected to the liquid-phase sintering and varies with both time and temperature, some of the phase refinement, but not all as shown above, was removed by the exposure to temperature required to form sufficient liquid-phase for good cladding.

The coatings were free of porosity, i.e., they were essentially continuous, the coating thickness varied because of the irregular nature of the particles. Scanning electron micrographs at 100X magnification showed the surface area to be very high due to surface irregularities related to the initial powder particle shapes and sizes.

EXAMPLE 3

Gas-atomized powders of 35Cr—13Ni—52Cu prepared as in Example 1b were used to coat-expanded metal mesh of 5 mil thick Ni—20Cr (2/0 mesh). Substrates were coated with powder by spraying with either a rubber cement adhesive or a 4% solution of polyvinyl alcohol in water then sifting the powder over the sprayed substrate and heat treating in argon to effect liquid-phase sintering. Using a hold at temperature of between 20 and 60 seconds for temperatures 2080° to 2100°F coherent, adherent claddings were produced of about 5 mils in thickness which were continuous (i.e., substantially free of porosity relative to the substrate) and of uniform microstructure, comprised of a continuous Cu-rich phase in which globular Cr-rich particles were dispersed, these particles averaging 10–12 microns in diameter. A diffusion bond was formed with the substrate. Similarly, samples of woven wire mesh of Type 304 stainless steel (21 mil wire diameter), Type 304 2/0 expanded metal mesh (12 mil sheet thickness), Nichrome Ni—Fe— Cr alloy 2/0 expanded metal mesh (7mil sheet thickness) and Inconel alloy 601 sheet (32 mil thickness) were clad with the same precursor powder and binders under similar conditions, excepting that the time and temperature were increased to 120 secs at 2125°F for the Inconel alloy 601 substrate because of its greater mass. All claddings were substantially the same, i.e., adherent, coherent fully dense, and approximately the same thickness and weight per unit area, and of high surface area. Similarly, 2 mil thick electroformed nickel mesh was coated and sintered at 2075°F with no residence time at temperature, with the same result.

EXAMPLE 4

A series of samples of atomized powders comprised of 25Cr—15Ni—60Cu and of mechanically alloyed powders comprised of 35Cr—13Ni—52Cu were placed in alundum boats and heated to peak temperatures of 2100°F. and 2170°F. Microscopic examination showed that the chromium-containing microconstituent was much coarser following the treatment at 2170°F then at 2100°F.

Similar results were obtained using gas-atomized 35Cr—13Ni—52Cu, deposited on a Nichrome mesh screen by a procedure similar to that described in Example 3. Comparison of the samples showed that the effect of Cr-coarsening in the claddings was not as pronounced as in the bulk-sintered powders, mainly because the large mass of the latter led to longer effective hold at temperature for parts of these samples. However, the tendency for separation of the liquid Cu-rich phase was stronger in the claddings with increased time and/or temperature, and led to inhomogeneous microstructures.

On the basis of these observations, the preferred treatment temperature is about 2080° to 2100°F for 35Cr—13Ni—52Cu alloy on 5 mil thick metal substrates.

As mentioned above, the temperature is related to the time, lower temperatures being effective when held for a longer period of time, thus the sintering temperature and time should be adjusted accordingly. For example, for gas-atomized 35Cr—13Ni—52Cu a sintering time of 5 minutes at 2050°F yields satisfactory coatings, but it is deemed desirable to minimize time at temperature to lessen oxidation possibilities.

EXAMPLE 5

Alloy powder of the composition 25Cr—30Ni—45Cu was prepared by gas atomization by a procedure substantially the same as described in Example 1b. The fraction passing a 60 mesh sieve was applied to Ni—20Cr alloy expanded metal mesh according to the method of Example 3 and liquid-phase sintered by exposure to temperatures between 2050°F and 2125°F for times between 0 and 120 seconds. Coherent, uniform coatings about 3–5 mils thick and fully dense, with a minimum of coarsening of the Ni-rich microconstituent and/or Cu-rich liquid separation were obtained for the time/temperature conditions: 0 sec/2100°F, 20–60 sec/2075°F, 60–120 sec/2050°F.

Similarly, gas-atomized alloy powder of composition 15Cr—50Ni—35Cu produced particularly good coatings with the time/temperature combinations 120 sec/2200°F, 60 sec/2240°F, 10 sec/2250°F.

Similarly, gas-atomized alloy powder of composition 15Cr—34Ni—51Cu was used to produce uniform, coherent, adherent, dense claddings by treatment for 60 sec/2100°F.

It will be appreciated that altering the thickness, mass or thermal characteristics of the substrate, or use of thicker applications of powder, will alter these optima to a small degree.

EXAMPLE 6

A mold of partially stabilized (with CaO) $ZrO_2$ was prepared by slip casting and firing. The mold was designed to produce a repeating square mesh pattern 4 ×

4 mm. Loose gas-atomized powder of composition 35Cr—13Ni—52Cu was poured on the mold and the entire assembly was treated in pure Ar by heating to 2125°F and then cooling, thus effecting liquid-phase sintering. A mesh of the precursor alloy was thus produced having uniform microstructure and freedom from structural porosity, and possessing malleability equivalent ot material of the same composition prepared in bulk form.

EXAMPLE 7

Various catalysts, prepared in accordance with this invention as coatings on an open mesh preform, substantially as described in Examples 2 and 3, were evaluated for their suitability as automotive exhaust purification catalysts in tests designed to simulate conditions in the first bed of a dual-bed catalytic system downstream of an automobile engine.

In the tests, the catalysts were in the form of ¾" × 2-⅛" sheets, rolled in jellyroll fashion to form cyclinders ⅝" diameter × 2-⅛" long. The catalyst was used in a fixed-bed downflow 20 mm diameter quartz reactor. Gaseous feeds simulating automobile exhaust were metered by flowmeters and passed continuously through the catalyst. The inlet gas had a composition, by volume, of approximately 0.15% NO, 1.50% CO, 0.05% $C_3H_8$, 10.0% $CO_2$, and the balance apart from $O_2$ and water vapor, $N_2$. The feed was saturated to 10.0% $H_2O$. The $O_2$ content was varied from 0 to 1.0% so that the effect of variation of $O_2$ level on the reactivity of the catalyst could be determined. The gas mixture was fed at an hourly space velocity of 40,000 volumes of gas per volume of catalyst per hour measured at standard temperature and pressure and at a bed temperature of 700°F to 1500°F. The effluent gas was continuously analyzed for NO and $NH_3$ by the photoluminescence method, and for CO by the non-dispersive infrared technique. The results were recorded graphically. The performance of the catalysts in typical tests run at 1300°F and at various indicated $O_2$ levels are tabulated in TABLE I. The oxygen levels of 0.5% and 0.75% are believed to represent realistic operating levels for an engine running slightly rich. Data for $NH_3$ formation are reported at zero oxygen added since $NH_3$ formation is maximum at this level in the synthetic exhaust mixture.

As indicated above, the catalysts were prepared from pre-alloyed powders substantially as described in Examples 2 and 3. The catalysts in TABLE I are as follows:

CATALYST A: 35Cr—13Ni—52Cu, 3 mil layer clad on Ni—20Cr 2/0 5 mil expanded metal mesh, liquid-phase sintered at 2100°F, oxidized 30 hours in air at 1500°F.

CATALYST B: 25Cr—30Ni—45Cu clad on Ni—20Cr 2/0 5 mil expanded metal mesh liquid-phase sintered at 2080°F. No subsequent surface treatment.

CATALYST C: 15Cr—50Ni—35Cu clad on Ni—20Cr 2/0 5 mil expanded metal mesh, liquid-phase sintered at 2230°F. No subsequent surface treatment.

Typical performance characteristics relative to the temperature are shown for Catalyst A in TABLE II, which gives NO and CO conversion at various temperatures ranging from 700°F to 1700°F for the given synthetic exhaust mixture.

TABLE I

PERCENT CATALYTIC CONVERSION OF NO AND CO
TEMPERATURE = 1300°F
SPACE VELOCITY = 40,000 hr -1

| CATALYST | | NO→$N_2$ | | $NH_3$ | CO→$CO_2$ | |
|---|---|---|---|---|---|---|
| | % $O_2$ → | 0.5 | 0.75 | 0 | 0.5 | 1.0 |
| A | | 93 | 95 | 10 | 80 | 84 |
| B | | 85 | 80 | 17 | 64 | 89 |
| C | | 96 | 95 | 4 | 73.5 | 97.3 |

TABLE II

| | | CATALYST TYPE A SPACE VELOCITY = 40,000 hr -1 | | | |
|---|---|---|---|---|---|
| TEMPERATURE | | NO→$N_2$ | | CO→$CO_2$ | |
| °F | % $O_2$ → | 0.5 | 0.75 | 1.0 | 2.5 |
| 700 | | 20 | 15 | 47 | 77 |
| 900 | | 48 | 50 | 80 | 95 |
| 1100 | | 73 | 70 | 90 | 97 |
| 1300 | | 93 | 93 | 94 | 97 |
| 1500 | | 97 | 95 | 90 | 97 |

The results in TABLES I and II show the catalysts of this invention are effective for purifying gas streams containing nitrogen oxides and CO. With respect to the removal of oxides of nitrogen, they are particularly effective at temperatures above 1100°F, e.g., 1300° and 1500°F at a space velocity of 40,000 hr $^{-1}$.

It will be noted that the oxidation treatment of Catalyst A produced a stratified catalytically active layer of oxide on the catalyst surface. An acid etch treatment before such oxidizing treatment is also effective.

Although the present invention has been described in conjuntion with preferred embodiments, it is to be understood that modifications and variations may be resorted to without departing from the spirit and scope of the invention as those skilled in the art will readily understand. Such modifications and variations are considered to be within the purview and scope of the invention and appended claims.

What is claimed is:

1. A method of making a shaped catalytic structure comprised of a chromium and copper-containing alloy comprising:
    a. forming into a structure of desired shape a fine powder comprised of an alloy containing chromium and copper, and
    b. heating the shaped powder to a temperature above about 2050°F in a non-oxidizing atmosphere for a period of time sufficient to effect a liquid-phase sintering of said fine powder;
thereby forming a coherent shaped structure.

2. A method of making a shaped catalytic structure comprised of an open mesh pre-formed heat resistant substrate and a catalytic layer comprised of a chromium and copper-containing alloy on said substrate comprising:
    a. applying a coating of a fugitive binder on said preformed substrate,
    b. depositing on said substrate a layer of a fine powder comprised of an alloy containing chromium and copper, and
    c. heating the resultant coated structure to a temperature above about 2050°F in a non-oxidizing atmosphere for a period
of time sufficient to effect a liquid-phase sintering of said powder layer, thereby substantially removing the fugitive binder and forming a coherent shaped structure.

3. A method according to claim 2 in which the fine powder is an alloy consisting essentially of chromium and copper.

4. A method according to claim 2 in which the fine powder is an alloy consisting essentially of chromium, nickel and copper.

5. A method according to claim 2 in which the liquid-phase sintering is effected at a temperature in the range of about 2050°F to about 2275°F.

6. A method according to claim 5 in which the peak temperature is held for a sufficient time for 15 volume % of the powder to form as a liquid.

7. A method according to claim 2 in which the non-oxidizing atmosphere is an inert gas, hydrogen, or high vaccum.

8. A method according to claim 2 in which the coherent layers formed by sequentially repeating steps (a), (b), and then sintering the resultant multi-coated structure according to step (c) to build up a coherent layer of about 2 to about 100 mils in thickness.

9. A method according to claim 2 in which the substrate is a nickel-containing alloy.

10. A method according to claim 2 in which the substrate is a metallized ceramic.

11. A method according to claim 2 in which the substrate is an open mesh metal in a configuration selected from expanded metal mesh, woven wire mesh, knitted metal mesh, gauze, honeycomb, and metal foam.

12. A method according to claim 2 in which the alloy powder is formed by mechanical alloying and the resultant coated structure, before reaching the peak temperature to effect liquid-phase sintering, is subjected to an intermediate temperature hold of about 1600°F to about 2000°F for a period of time sufficient to control the particle size and interparticle spacing of microconstituents which precipitate in a solid state reaction.

13. A method according to claim 2 in which the shaped structure consisting essentially of a pre-formed substrate with a coherent, adherent, layer thereon comprising an alloy containing chromium and coopper is thereafter treated at an elevated temperature in a gas phase atompshere which is oxygenating with respect to said alloy to develop an oxidation resistant stratified catalytically active surface on the coherent alloy layer.

14. A method according to claim 2 in which the fugitive binder is an organic elastomer or polyvinyl alcohol in a compatible vehicle.

15. A composite catalyst comprising an open mesh pre-formed heat resistant substrate and a catalytic layer comprised of a coherent, adherent layer comprising a substantially uniform alloy containing chromium and copper on said substrate, wherein said catalytic layer is formed by the method of claim 2.

16. A composite catalyst according to claim 15 in which the catalytic layer is comprised of an alloy consisting essentially of chromium and the balance essentially copper.

17. A composite catalyst according to claim 15 in which the catalytic layer is comprised of an alloy consisting essentially of chromium, nickel and copper.

18. A composite catalyst according to claim 15 in which the open mesh substrate is a nickel-containing alloy.

19. A composite catalyst according to claim 15 in which the open mesh substrate is a metallized ceramic.

20. A method according to claim 2 in which the alloy containing chromium and copper is prepared by a method comprising at least one of the techniques of atomization, mechanical alloying, splat cooling and plasma spraying.

21. A method according to claim 2 in which the substrate is a ceramic.

22. A composite catalyst according to claim 15 in which the substrate is a ceramic.

* * * * *